(12) United States Patent
Okumura

(10) Patent No.: US 8,690,338 B2
(45) Date of Patent: Apr. 8, 2014

(54) REFLECTIVE LIQUID CRYSTAL PROJECTOR

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 13/010,750

(22) Filed: Jan. 20, 2011

(65) Prior Publication Data

US 2011/0181801 A1 Jul. 28, 2011

(30) Foreign Application Priority Data

Jan. 27, 2010 (JP) ................................. 2010-015131

(51) Int. Cl.
*G03B 21/14* (2006.01)

(52) U.S. Cl.
USPC ............... 353/20; 353/30; 353/33; 353/38; 353/88; 353/97; 349/5; 349/9; 359/489.07

(58) Field of Classification Search
USPC .......... 353/20, 22, 23, 30, 33, 37, 38, 77, 81, 353/85, 88, 94, 97, 98, 101; 349/5–10, 18, 349/96, 193, 194; 359/489.07, 189.15, 359/489.06, 487.05, 487.06
See application file for complete search history.

(56) References Cited

U.S. PATENT DOCUMENTS

| | | | |
|---|---|---|---|
| 6,805,445 B2 * | 10/2004 | Silverstein et al. ............. | 353/20 |
| 6,877,865 B2 | 4/2005 | English, Jr. et al. | |
| 7,008,065 B2 | 3/2006 | English, Jr. et al. | |
| 7,480,013 B2 * | 1/2009 | Asami et al. ...................... | 349/5 |
| 7,518,662 B2 * | 4/2009 | Chen et al. ......................... | 349/5 |
| 7,643,053 B2 | 1/2010 | Shimizu et al. | |
| 7,773,163 B2 | 8/2010 | Shimizu et al. | |
| 8,237,876 B2 | 8/2012 | Tan et al. | |
| 2002/0171809 A1 | 11/2002 | Kurtz et al. | |
| 2005/0024591 A1 | 2/2005 | Lian et al. | |
| 2006/0098283 A1 | 5/2006 | Sato | |
| 2006/0152687 A1 | 7/2006 | Robinson | |
| 2007/0030424 A1 * | 2/2007 | Shimizu et al. ............... | 349/113 |

(Continued)

FOREIGN PATENT DOCUMENTS

| | | |
|---|---|---|
| CA | 1497334 A | 5/2004 |
| CN | 1535539 A | 10/2004 |

(Continued)

OTHER PUBLICATIONS

European Search Report issued May 4, 2011.

*Primary Examiner* — Sultan Chowdhury

(74) *Attorney, Agent, or Firm* — Lowe Hauptman & Ham, LLP

(57) ABSTRACT

A reflective liquid crystal projector according to the aspect of the invention includes a light source, a reflective liquid crystal panel, and a wire grid polarization beam splitter element. The wire grid polarization beam splitter element is provided with a polarization beam split surface that reflects a first polarized light component and transmits a second polarized light component. The reflective liquid crystal projector also includes a projection optical system that projects the first polarized light component, and an aperture stop that is disposed on an optical path of the light beam emitted from the light source. The aperture stop limits the amount of first light more than that of second light. The first light is divergent from the reflective liquid crystal panel to the polarization beam split surface. The second light is divergent from the reflective liquid crystal panel to the polarization beam split surface.

6 Claims, 12 Drawing Sheets

(56) References Cited

U.S. PATENT DOCUMENTS

| | | |
|---|---|---|
| 2007/0076133 A1 | 4/2007 | Shimizu et al. |
| 2008/0158511 A1 | 7/2008 | Takenaka et al. |
| 2009/0310042 A1* | 12/2009 | Vidal et al. ............ 349/8 |
| 2011/0234928 A1 | 9/2011 | Masuda et al. |

FOREIGN PATENT DOCUMENTS

| | | |
|---|---|---|
| JP | 11281923 A | 10/1999 |
| JP | 2005-516249 A | 6/2005 |
| JP | 2006-113282 A | 4/2006 |
| JP | 2006308787 A | 9/2006 |
| JP | 2007-079054 A | 3/2007 |
| JP | 2007094399 A | 4/2007 |
| JP | 2007-212997 A | 8/2007 |
| JP | 2007522491 A | 8/2007 |
| JP | 2008275798 A | 11/2008 |
| JP | 2010-014926 A | 1/2010 |
| WO | 2005066691 A1 | 7/2005 |

\* cited by examiner

REFLECTIVE LIQUID CRYSTAL PROJECTOR

BACKGROUND

1. Technical Field

The present invention relates to a reflective liquid crystal projector.

2. Related Art

Presently, reflective liquid crystal projectors are known as a kind of liquid crystal projectors. The reflective liquid crystal projector includes, for example, a light source, a polarization beam splitter (referred to as "PBS" hereinafter), a reflective liquid crystal panel, and a projection optical system. A light beam having been emitted from the light source is transmitted through the PBS and strikes the reflective liquid crystal panel. Typically, the PBS is positioned at an angle of 45° relative to a normal direction of the reflective liquid crystal panel. The light beam having struck the reflective liquid crystal panel is modulated and reflected by the reflective liquid crystal panel. The light beam having been reflected by the reflective liquid crystal panel strikes again the PBS to be split into a polarized light component that indicates an image and a different polarized light component that indicates a reversed image. The polarized light component that indicates the image is projected onto a screen or the like with the projection optical system. Thus, the image is displayed.

With the reflective liquid crystal projectors, a high contrast ratio and high luminance of a projected image can be achieved compared with those achieved with transmissive liquid crystal projectors. The reflective liquid crystal projectors have been widely used for home theaters, digital cinemas, digital signage, and so forth, where the above advantages can be made use of. However, with regard to further improvement of the contrast ratio, the fact that a polarization beam split function of the PBS depends on incidence angles has become a major obstacle.

The light beam having exited from the reflective liquid crystal panel is not typically a collimated light beam but a diverging light beam having divergence of, for example, about an angle of 20°. When the PBS splits the polarized light component of incident light having an incident angle in a range of 45°±10° without sufficient precision, the image is displayed in a state where part of the polarized light component that indicates the reversed image is not split from the polarized light component that indicates the image. This makes it difficult to improve the contrast ratio.

A related art PBS is constituted by two rectangular prisms, each of which has an inclined surface coated with a dielectric multilayer film. The two prisms are attached to each other at the inclined surfaces. Recently, wire grid PBSs have been in use. The wire grid PBSs feature a polarization beam split function that is less dependent upon incidence angles than that of the related art PBSs, thereby significantly increasing the contrast ratio of the reflective projectors.

However, since even the wire grid PBSs are dependent upon incidence angles, a super high contrast ratio (for example, 1:50000) cannot be easily achieved. JP-A-2006-113282, JP-A-2007-212997, and JP-A-2005-516249 disclose techniques that utilize an aperture stop to limit divergence of a light beam exiting from a reflective liquid crystal panel for improving the contrast ratio.

JP-A-2006-113282 discloses a technique that limits angles at which a light beam strikes a PBS. According to JP-A-2006-113282, angle characteristics at a PBS are improved and a projected state of an image in which the contrast is emphasized can be achieved by narrowing a light beam, and a projected state of an image in which a large amount of light is projected and brightness is emphasized can be achieved by widening the light beam.

According to JP-A-2007-212997, attention is focused on visual angle characteristics of liquid crystals, and an aperture stop having a cross-shaped aperture is used. This aperture stop is narrowed from four corners of the aperture in diagonal directions. With this aperture stop, according to the document, light in a visual angle direction where the contrast ratios are low can be blocked.

According to JP-A-2005-516249, aperture stops of an elliptically shaped aperture and a cross shaped aperture are used, with which the contrast ratio can be improved with a minimum reduction in brightness.

The techniques disclosed in the above documents may improve the contrast ratio. However, improvement is still required as described below in order to further increase the contrast ratio with a minimum reduction in brightness.

According to the technique disclosed in JP-A-2006-113282, if an incidence angle at the PBS is limited by the aperture stop, the displayed image becomes dark as is the case with the ordinary technique. This makes it difficult to achieve a projected image featuring both high contrast and high luminance.

According to the technique disclosed in JP-A-2007-212997, angular light components that should be shielded in terms of the visual angle characteristics of the liquid crystals are not necessarily the same as angular light components that should be shielded in terms of the incidence-angle dependency of the PBS. Therefore, there is the possibility that the high contrast may not be achieved because of insufficient separation of light that indicates a reversed image. In addition, a ratio of shielding of light indicating the image may be increased and, accordingly, the brightness may be reduced.

According to the technique disclosed in JPA-2005-516249, the polarization beam split function of the wire grid PBS is not affected by incidence angles (refer to paragraph 0039 in the document). Therefore, it is difficult to suppress the reduction in contrast ratio due to the incidence-angle dependency of the wire grid PBS. As a result, there is the possibility that the high contrast cannot be achieved. JP-A-2005-516249 also describes that light is preferentially blocked at both ends of a beam of light to a variety of degrees (refer to paragraph 0026 in the document), although this description is not consistent with the description in paragraph 0039. However, what kind of aperture stop can compensate for the polarization beam split function of the wire grid PBS is not described. Therefore, there still is the possibility that the high contrast cannot be achieved and the brightness is reduced due to the reason that is the same as that of JP-A-2007-212997.

SUMMARY

An advantage of some aspect of the invention is that a reflective liquid crystal projector is provided with which both the high contrast and the high luminance are achieved.

According to an aspect of the invention, the above-described advantage is achieved as follows. A reflective liquid crystal projector according to the aspect of the invention includes a light source, a reflective liquid crystal panel that modulates a light beam emitted from the light source, and a wire grid polarization beam splitter element that is disposed in a position where the light beam having been modulated with the reflective liquid crystal panel strikes. The wire grid polarization beam splitter element is provided with a polarization beam split surface that reflects a first polarized light component of the modulated light beam and transmits a second polarized light component having a polarization direction that substantially perpendicularly intersects the first polarized light component. The reflective liquid crystal projector also includes a projection optical system that projects the first polarized light component having been reflected by the wire grid polarization beam splitter element, and an aperture stop that is disposed on an optical path of the light beam emitted from the light source. The aperture stop limits the amount of first light more than that of second light. The first light is divergent from the reflective liquid crystal panel to the polarization beam split surface so as to spread in a polarization direction of the first polarized light component. The second light is divergent from the reflective liquid crystal panel to the polarization beam split surface so as to spread in the polarization direction of the second polarized light component.

The light beam emitted from the light source is modulated with the reflective liquid crystal panel. After that, the modulated light beam is split into the first polarized light component and the second polarized light component with the wire grid polarization beam splitter element (hereinafter abbreviated to the WG element). The first polarized light component is projected to display an image.

The inventor has studied the incidence-angle dependency of the polarization beam split function of the WG element. Although the details will be described below in DESCRIPTION OF EXEMPLARY EMBODIMENTS, the inventor has observed that precision in splitting a polarized component from a light beam that is divergent so as to spread in the polarization direction of the first polarized light component that is reflected by the WG element (hereinafter referred to as a reflective axis direction) is lower than precision in splitting a polarized component from a light beam that is divergent so as to spread in the polarization direction of the second polarized light component that is transmitted through the WG element (hereinafter referred to as a transmission axis direction). This means that the light beam reflected by the WG element tends to include more second polarized light components included in the first light than the second polarized light components included in the second light.

In the reflective liquid crystal projector according to the aspect of the invention, the amount of the first light is limited more than that of the second light with the aperture stop is. Therefore, the light amount of the first polarized light component, which indicates the image to be displayed, limited by the aperture stop is decreased and the second polarized light component, which indicates the reversed image, can be removed from the light beam to be projected. This can achieve both the high contrast and high luminance.

The reflective liquid crystal projector according to the aspect of the invention may be embodied as follows as typical embodiments.

It is preferable that the aperture stop include a light shielding portion having an aperture through which light passes. The aperture is formed such that the maximum inner dimension of the aperture in the polarization direction of the first polarized light component that passes through the aperture is smaller than that in a direction perpendicular to the polarization direction of the first polarized light component.

By doing this, a transmission factor of the first light becomes lower than that of the second light in the aperture stop, thereby limiting the amount of the first light more than that of the second light. Thus, both the high contrast and the high luminance can be achieved.

It is preferable that the polarization beam split surface of the wire grid polarization beam splitter element not be parallel with a light exit surface of a liquid crystal layer included in the reflective liquid crystal panel. The aperture stop may limit the amount of third light more than fourth light. The third light may be divergent so as to spread along a side of the polarization beam split surface that is an increasing distance from the light exit surface of the liquid crystal layer, and the fourth light is divergent so as to spread along a side of the polarization beam split surface that is a decreasing distance from the light exit surface of the liquid crystal layer.

In general, reflectance at an interface increases as a light incidence angle relative to the interface becomes larger. In the above-described structure, the third light, which is divergent so as to spread along the side of the polarization beam split surface that is an increasing distance from the light exit surface of the liquid crystal layer, has an incidence angle that is larger than that of the fourth light, which is divergent so as to spread along the side of the polarization beam split surface that is a decreasing distance from the light exit surface of the liquid crystal layer. Since the third light of the first polarized light component that indicates the reversed image has a greater incidence angle relative to the polarization beam split surface that the fourth light has, the third light becomes more reflective at the polarization beam split surface and easily mixes with the first polarized light component reflected by the polarization beam split surface. According to the above-described structure, the aperture stop limits the amount of the third light more than that of the fourth light. Thus, an effect of improving the contrast ratio with a minimum reduction in brightness can be achieved.

It is preferable that the aperture stop include a light shielding portion having an aperture through which light passes. Inner dimensions of the aperture in the polarization direction of the first polarized light component that passes through the aperture are such that, in the direction perpendicular to the polarization direction of the first polarized light, the inner dimension is smaller on a side where the third light strikes than the other inner dimension on another side where the fourth light strikes.

By doing this, a transmission factor of the third light in the aperture stop becomes lower than that of the fourth light in the aperture stop, thereby limiting the amount of the third light more than that of the fourth light. Thus, the effect of improving the contrast ratio with a minimum reduction in brightness can be achieved.

It is preferable that the aperture stop be disposed on a pupil plane of the projection optical system.

By doing this, since the aperture stop is disposed on a pupil plane, the amount of the first light can be limited more than that of the second light is without decreasing the size of the image to be displayed. Angular light components of the light beam having exited from the reflective liquid crystal panel form spots that are spatially mapped in accordance with the angles (Fourier transform image) on the pupil plane of the projection optical system. This facilitates selective limitation of the light amount of the desired angular light components out of the light beam having struck the pupil plane. Since the light amount is limited immediately before the light is projected, such a light component that indicates the reversed image can be removed as desired.

It is preferable that the reflective liquid crystal projector further include a lens array that is provided on an optical path between the light source and the reflective liquid crystal panel. The lens array has a plurality of lens elements arranged on a plane that substantially perpendicularly intersects the optical axis of the light source. The reflective liquid crystal projector may also include a superimposing lens that is disposed on an optical path between the lens array and the reflective liquid crystal panel. Each of the plurality of lens elements may condense a corresponding one of the light beams having been emitted from the light source, the superimposing lens may superimpose each of the light beams having been condensed with a corresponding one of the plurality of lens elements on the reflective liquid crystal panel, and the aperture stop may be disposed on an optical path between the lens array and the superimposing lens.

By doing this, the light source beams spatially separately strike the plurality of lens elements, and the light beams condensed with individual lens elements are superimposed on the reflective liquid crystal panel by the superimposing lens. Thus, illumination intensity of the light source beams is uniformized. This causes illumination intensity of the light beam that has struck the reflective liquid crystal panel to be uniformized, thereby decreasing unevenness in brightness of the image to be displayed. Angular light components are difficult to be split with the WG element after they have exited the reflective liquid crystal panel. Here, the light amounts of the angular light components are limited before the angular light components strike the reflective liquid crystal panel. This can achieve both the high contrast and the high luminance. In addition, a light resistance of the reflective liquid crystal panel can be increased. In particular, when an aperture stop is also disposed on the pupil plane of the projection optical system, the effect of improving the contrast ratio with a minimum reduction in brightness can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
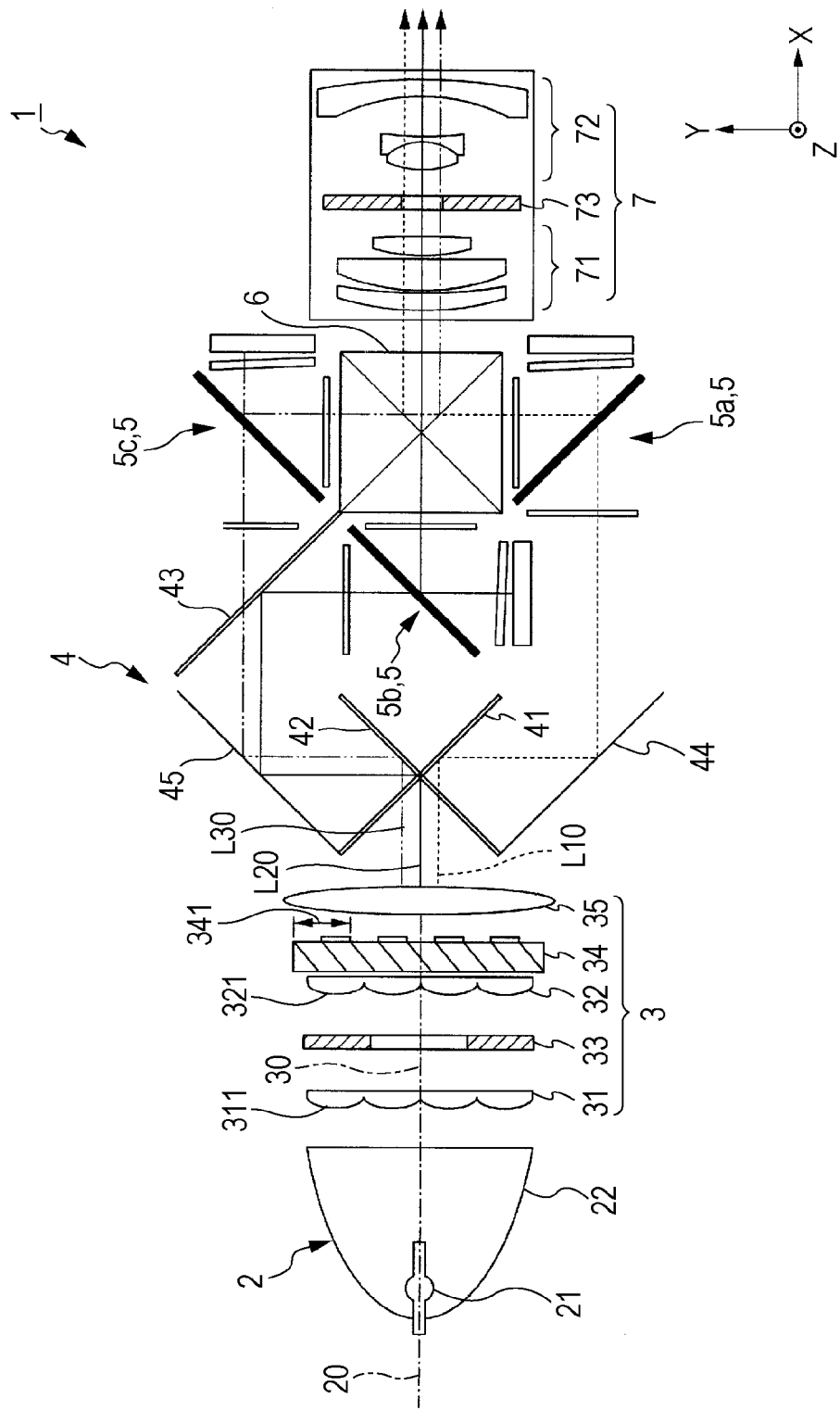
FIG. 1 is a schematic diagram illustrating a general configuration of a projector according to an aspect of the invention.

Embodiments according to an aspect of the invention will be described below with reference to the drawings. It is noted that, in the drawings for the descriptions, structures may not be drawn in accordance with dimensions and scales of actual structures in order to clearly show characteristic portions. It is also noted that similar components in the embodiments are denoted by like reference numerals in the drawings and detailed descriptions thereof are omitted.

Figure 2:
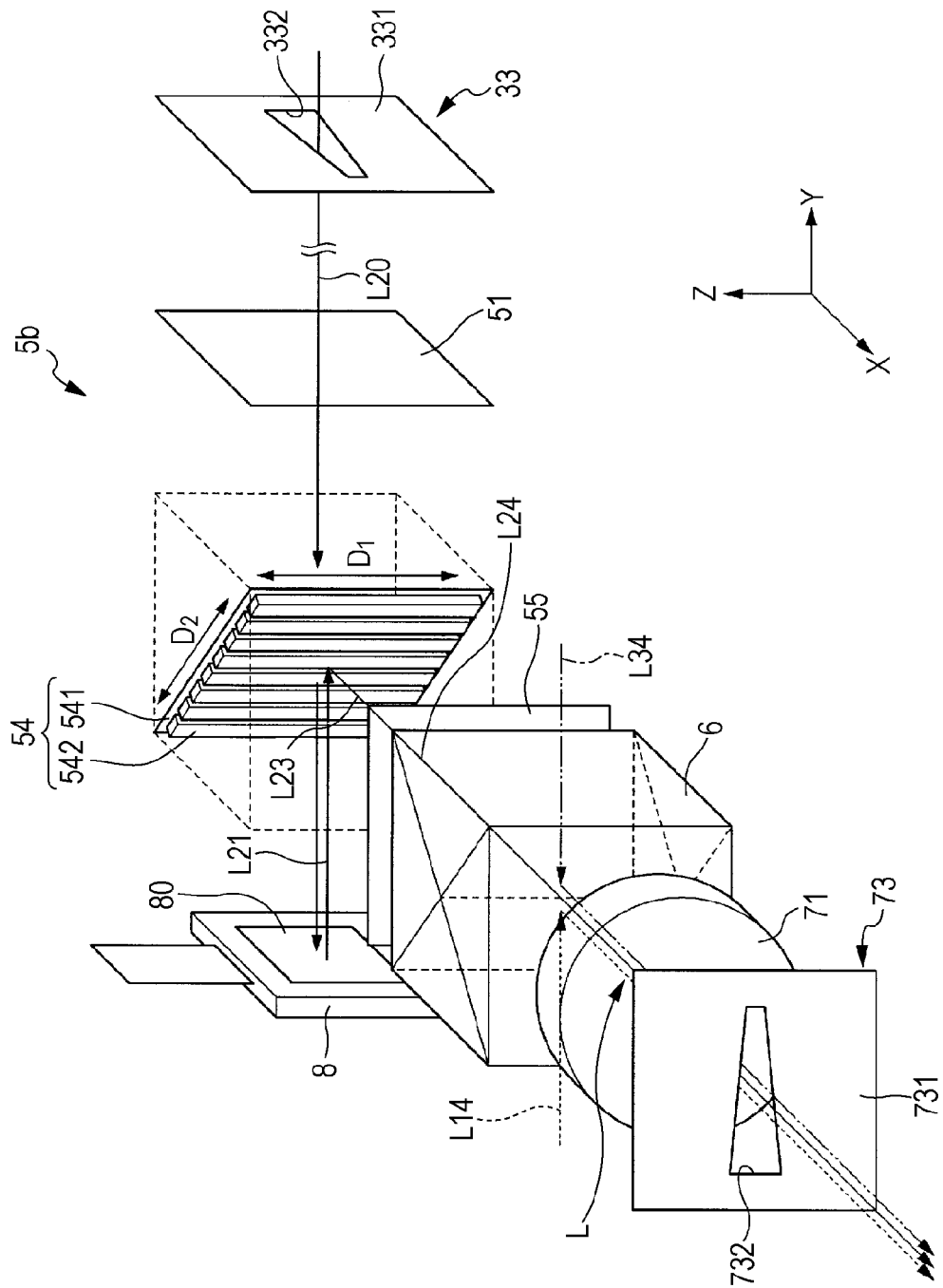
FIG. 2 is a schematic diagram illustrating an optical path in one of image forming systems.
Figure 3:
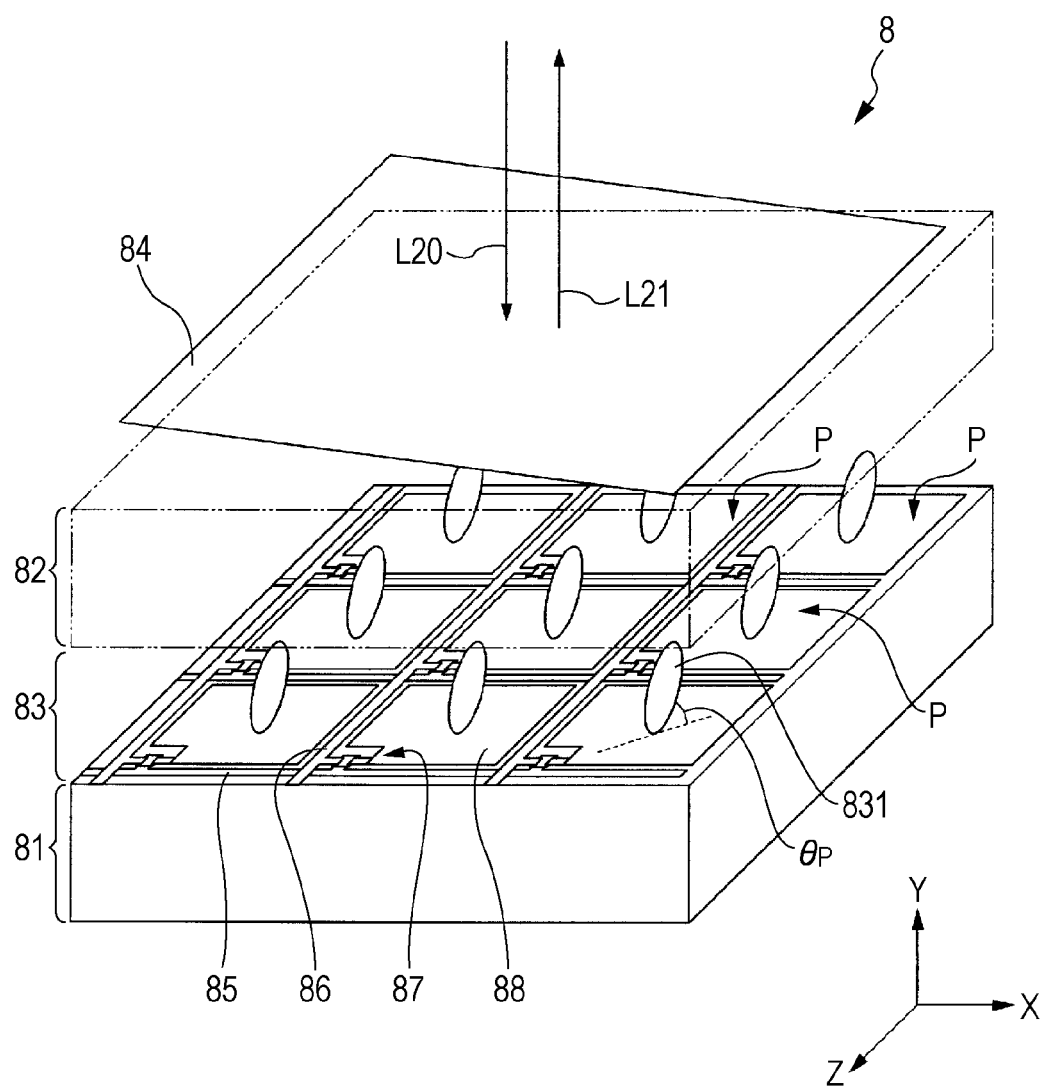
FIG. 3 is an exploded perspective view schematically illustrating a configuration of a reflective liquid crystal panel.

FIG. 1 is a schematic diagram illustrating a general configuration of a projector 1 of one embodiment according to an aspect of the invention. FIG. 2 is a schematic diagram illustrating an optical path in a second image forming system 5b. FIG. 3 is an exploded perspective view schematically illustrating a configuration of a reflective liquid crystal panel.

As illustrated in FIG. 1, the projector 1 includes a light source 2, an integrator optical system 3, a color splitting optical system 4, three image forming systems 5, a color combining element 6, a projection optical system 7, and aperture stops. The three image forming systems 5 include a first image forming system 5a, the second image forming system 5b, and a third image forming system 5c. The aperture stops include an incidence side aperture stop 33 and an exit side aperture stop 73. The incidence side aperture stop 33 is incorporated into the integrator optical system 3 and the exit side aperture stop 73 is incorporated into the projection optical system 7. In general, the projector 1 operates as follows.

Light source beams emitted from the light source 2 strike the integrator optical system 3. The integrator optical system 3 makes the illumination intensity and polarization states of the struck light source beams uniform. The incidence side aperture stop 33 blocks wide angle components of the light source beams that pass therethrough. Then the light source beams are output. The color splitting optical system 4 splits the light source beams having exited the integrator optical system 3 into color light beams of different colors. The color light beams strike corresponding image forming systems 5 separately provided for different colors. The color light beams having struck the corresponding three image forming systems 5 are modulated and become modulated light beams in accordance with image data of an image to be displayed. The color combining element 6 combines the modulated light beams of three colors that have exited the three image forming systems 5 into a polychromatic beam, which strikes the projection optical system 7. When the polychromatic beam strikes the projection optical system 7, components thereof representing a reversed image are blocked by the exit side aperture stop 73. The resultant light beam is projected onto a projection surface such as a screen (omitted from the drawing). This causes the image to be displayed on the projection surface in full-color.

Next, components of the projector 1 will be described below in detail.

The light source 2 includes a light source lamp 21 and a parabolic reflector 22. Light beams emitted from the light source lamp 21 are reflected by the parabolic reflector 22 in one direction to be substantially collimated. The resultant light beams strike the integrator optical system 3 as the light source beams. Examples of the light source lamp 21 include, for example, a metal halide lamp, a xenon lamp, a high-pressure mercury lamp, and a halogen lamp. An elliptical reflector, a spherical reflector, or the like may be used instead of the parabolic reflector 22. A collimating lens that collimates the light beams reflected by the reflector may be used in accordance with the shape of the reflector.

The integrator optical system 3 includes a first lens array 31, a second lens array 32, the incidence side aperture stop 33, a polarization conversion element 34, and a superimposing lens 35. An optical axis 30 of the integrator optical system 3 is substantially identical to an optical axis 20 of the light source 2. Each of the components of the above-described integrator optical system 3 is disposed so as to be centered on the optical axis 30 of the integrator optical system 3. In the present embodiment, the incidence side aperture stop 33 is disposed on the optical path between the first lens array 31 and the second lens array 32 along the optical path between the first lens array 31 and the superimposing lens 35. The incidence side aperture stop 33, together with the exit side aperture stop 73, will be described below.

The first lens array 31 includes lens elements 311 disposed in a plane substantially perpendicular to the optical axis 20 of the light source 2. Likewise, the second lens array 32 includes the lens elements 321. The lens elements 311 and the lens elements 321 are, for example, arranged in a matrix. Planar shapes of the lens elements 311 and the lens elements 321 on planes perpendicular to the optical axis 30 are similar (substantially rectangular here) to the shape of an illuminated area 80 of a reflective liquid crystal panel 8 as illustrated in FIG. 2. The illuminated area 80 includes the entirety of an area where pixels are arranged in the reflective liquid crystal panel 8.

The polarization conversion element 34 includes polarization conversion units 341. Each polarization conversion unit 341, the detailed structure of which is not shown, includes a polarization beam splitter film (referred to as a "PBS film" hereinafter), a half-phase plate, and a reflecting mirror.

The lens elements 311 of the first lens array 31 and the lens elements 321 of the second lens array 32 correspond to one another in a one-to-one relationship. The lens elements 321 of the second lens array 32 and the polarization conversion units 341 of the polarization conversion element 34 correspond to one another in a one-to-one relationship. A lens element 311, the corresponding lens element 321 and the corresponding polarization conversion unit 341 are arranged along an axis substantially parallel to the optical axis 30.

The light source beams having struck the integrator optical system 3 in a spatially separately manner strike the lens elements 311 of the first lens array 31. The light source beams having struck the individual lens elements 311 are separately condensed in the lens elements 311. The light source beams condensed by the lens elements 311 pass through the incidence side aperture stop 33 and produce images on lens elements 321 that correspond to the lens elements 311. In other words, a second light source image is formed on each of the lens elements 321 of the second lens array 32. The light beams from the second light source images formed on the lens elements 321 strike the polarization conversion units 341 that correspond to the lens elements 321.

Each light beam having struck the corresponding polarization conversion unit 341 is split into a p-polarized light component that is p-polarized with respect to the PBS film and an s-polarized light component that is s-polarized with respect to the PBS film. One of the split polarized light components is reflected by the reflective mirror, then passes through the half-phase plate and thereby has a polarization state the same as the other polarized light component. Here, the polarization states of the light beams having passed through the polarization conversion units 341 are made to match to that of the p-polarized light component that is p-polarized with respect to a polarization beam split surface 540 of a wire grid (WG) element 54, which will be described below. The light beams having exited the polarization conversion units 341 strike the superimposing lens 35 and are refracted and superimposed on the illuminated area 80 of the reflective liquid crystal panel 8. The light beams spatially separated by the first lens array 31 illuminate substantially the whole area of the illuminated area 80. This causes illumination distribution to be averaged and illumination intensity in the illuminated area 80 to be uniformized.

The color splitting optical system 4 includes first to third dichroic mirrors 41 to 43, which include wavelength selection surfaces, and first and second reflective mirrors 44 and 45. The first dichroic mirror 41 reflects a red light beam and transmits a green light beam and a blue light beam. The second dichroic mirror 42 transmits a red light beam and reflects a green light beam and the blue light beam. The third dichroic mirror 43 reflects a green light beam and transmits a blue light beam. The first and second dichroic mirrors 41 and 42 are disposed so that the wavelength selection surfaces thereof substantially perpendicularly intersect each other and so that an angle of about 45° is formed between each wavelength selection surface and the optical axis 30 of the integrator optical system 3.

Red light beams L10, green light beams L20, and blue light beams L30 included in the light source beams that have struck the color splitting optical system 4, are split from each other as follows. The split color light beams strike the corresponding image forming systems 5.

Each light beam L10 is transmitted through the second dichroic mirror 42 and is reflected by the first dichroic mirror 41. Then, the light beam L10 is reflected by the first reflective mirror 44 and strikes the first image forming system 5a.

Each light beam L20 is transmitted through the first dichroic mirror 41 and is reflected by the second dichroic mirror 42. After that, the light beam L20 is reflected by the second reflective mirror 45 and then by the third dichroic mirror 43 and strikes the second image forming system 5b.

Each light beam L30 is transmitted through the first dichroic mirror 41 and is reflected by the second dichroic mirror 42. After that, the light beam L30 is reflected by the second reflective mirror 45 and is then transmitted through the third dichroic mirror 43 and strikes the third image forming system 5c.

The first to third image forming systems 5a to 5c have similar structures. In the description here, the structure of the second image forming system 5b also represents those of the first to third image forming systems 5a to 5c.

As illustrated in FIG. 2, the second image forming system 5b includes an incidence side polarizing plate 51, the WG element 54, the reflective liquid crystal panel 8, and the exit side polarizing plate 55. It is noted that the dashed lines in FIG. 2 are additional lines drawn to clarify the positional relationship with the WG element 54 and do not represent something that actually exists. Unlike related art dielectric multilayer PBSs, wire grid polarization beam splitter elements do not need to be sandwiched between triangle prisms. For the purpose of clear understanding of positional relationship between the individual components in FIG. 2, the incidence side polarizing plate 51, the reflective liquid crystal panel 8, and the exit side polarizing plate 55 are drawn as components detached from each other. However, these components are actually arranged in such positions where they are in contact with the dashed lines in FIG. 2.

The green light beam L20, which is part of the light source beams that have exited the color splitting optical system 4, strikes the incidence side polarizing plate 51. The incidence side polarizing plate 51 allows a linear polarized light component to pass therethrough. A transmission axis is set in the incidence side polarizing plate 51 so as to allow a p-polarized light component that is p-polarized with respect to a polarization beam split surface 540 of the WG element 54 to pass through, which will be described below. Hereinafter, a p-polarized light component that is p-polarized with respect to the polarization beam split surface 540 of the WG element 54 is simply referred to as a "p-polarized light component" and an s-polarized light component that is s-polarized with respect to the polarization beam split surface 540 of the WG element 54 is simply referred to as an "s-polarized light component." As described above, the polarization state of the light source beams having passed the integrator optical system 3 is made to match that of a p-polarized light component. Most of the light beam L20 passes through the incidence side polarizing plate 51 and strikes the WG element 54.

The WG element 54 includes a dielectric layer 541 and metal wires 542. Examples of the dielectric layer 541 include a glass substrate and so forth. The metal wires 542 are provided on the surface of the dielectric layer 541. All the metal wires 542 extend in one direction (Z-direction) and are spaced parallel with each other. A direction in which the metal wires 542 extend is a reflective axis direction $D_1$, and a direction in which the metal wires 542 are spaced is a transmission axis direction $D_2$. The polarization beam split surface 540, which is parallel with the reflective axis direction $D_1$ and also parallel with the transmission axis direction $D_2$, is a principal surface of the WG element 54. A direction of a line normal to the polarization beam split surface 540 forms an angle of about 45° with a central axis of the light beam L20 that strikes the polarization beam split surface 540.

Out of the light beam L20 having struck the polarization beam split surface 540, the s-polarized light component (first polarized light component) having a polarization direction in the reflective axis direction $D_1$ is reflected by the polarization beam split surface 540, and the p-polarized light component (second polarized light component) having a polarization direction in the transmission axis direction $D_2$ is transmitted through the polarization beam split surface 540. Most of the green light beam L20 having exited the integrator optical system 3 is generally p-polarized, and strikes the reflective liquid crystal panel 8 through the polarization beam split surface 540.

As illustrated in FIG. 3, the reflective liquid crystal panel 8 includes an element substrate 81, an opposite substrate 82, a liquid crystal layer 83, and a compensating plate 84. The element substrate 81 is disposed opposite the opposite substrate 82. The liquid crystal layer 83 is disposed between the element substrate 81 and the opposite substrate 82. The compensating plate 84 is disposed on a side of the opposite substrate 82 opposite the liquid crystal layer 83. The green light beam L20 having passed through the WG element 54 strikes the compensating plate 84, passes through the opposite substrate 82, and strikes the liquid crystal layer 83. Then the green light beam L20 is reflected backward by the element substrate 81. While passing through the liquid crystal layer 83, the green light beam L20 is modulated into a light beam L21, which exits the reflective liquid crystal panel 8 through the opposite substrate 82 and the compensating plate 84.

The element substrate 81 is formed of a silicon substrate or a glass substrate as a base material. A so-called liquid crystal on silicon (LCOS) technology is used when the base material used is a silicon substrate. The element substrate 81 includes gate lines 85, source lines 86, thin film transistors (hereinafter referred to as TFTs) 87, and pixel electrodes 88.

The gate lines 85 extend parallel with each other. The source lines 86 extend parallel with each other. An extending direction of the gate lines 85 (X-direction) intersects (perpendicularly here) an extending direction of the source lines 86 (Z-direction). The TFTs 87 are provided at the individual intersections of the gate lines 85 and the source lines 86. The gate lines 85 are electrically connected to gate electrodes of the TFTs 87. The source lines 86 are electrically connected to source regions of the TFTs 87.

Areas surrounded by the gate lines 85 and the source lines 86 form modulation elements. In the present embodiment, one modulation element constitutes one pixel P. The pixels P are equally spaced in one direction (X-direction) and equally spaced in another direction (Z-direction). The pixels P are independently provided with the island-shaped pixel electrodes 88. The pixel electrodes 88 of the present embodiment are formed of a metal material and are also used as specular reflectors. In FIG. 3, the pixel electrodes 88 are cut apart to schematically illustrate the underlying sides of the pixel electrodes 88. In reality, the pixel electrodes 88 cover the gate lines 85, the source lines 86, and the TFTs 87 using a planarizing layer and an insulating layer, thereby increasing an opening ratio of the pixels P. The pixel electrodes 88 are electrically connected to drain regions of the TFTs 87. An alignment layer (omitted from the drawing) is provided so as to cover the pixel electrodes 88.

The opposite substrate 82 is composed of a transparent substrate such as a glass substrate as a base material. The detailed structure of the opposite substrate 82 is not illustrated in the figure. A common electrode formed of an electrically conductive transparent material is provided on the liquid crystal layer 83 side of the opposite substrate 82. The alignment layer is provided on the liquid crystal layer 83 side of the common electrode. The alignment layers provided on the element substrate 81 and the opposite substrate 82 are inorganic alignment layers formed using a method such as an oblique deposition method.

The liquid crystal layer 83 includes, for example, a vertical alignment (VA) mode liquid crystal layer. A cell gap between the element substrate 81 and the opposite substrate 82 is, for example, about 2.0 μm. The cell gap is filled with a liquid crystal material to form the liquid crystal layer 83. The liquid crystal material has a negative dielectric anisotropy with a double refractivity Δn of 0.12, for example. Liquid crystal molecules 831 included in the liquid crystal layer 83 are positioned at a pre-tilt angle $\theta_p$ of, for example, about 87° with respect to a direction)(0°) along the substrate surface of the element substrate 81. The compensating plate 84 is composed of, for example, a negative C-plate. The compensating plate 84 is inclined at about 4.5° relative to the direction along the substrate surface of the element substrate 81 so as to compensate a phase difference generated by the pre-tilt angle of the liquid crystal molecules 831.

In the reflective liquid crystal panel 8 having such a structure, when a selection pulse is supplied through a gate line 85, the TFT 87 connected to that gate line 85 is turned on. In a state where the TFT 87 is turned on, a source signal that corresponds to a gradation value of the corresponding pixel is output through the source line 86 and supplied to the pixel electrode 88 through the TFT 87. When the source signal is supplied to the pixel electrode 88, an electric field is applied between this pixel electrode 88 and the common electrode. The orientation state in the liquid crystal layer 83 is changed for each separate pixel P in response to such an electric field. The polarization state of the light beam L20 having struck the pixel P changes in accordance with the orientation state in a portion of the liquid crystal layer 83 corresponding to the pixel P. The light beam L20 having passed through the liquid crystal layer 83 exits the light exit surface of the liquid crystal layer 83 as the modulated light beam L21.

In the present embodiment, in a state where an electric field is not applied to the portion of the liquid crystal layer 83 corresponding to the pixel P, the polarization state of the light beam L20 having struck the pixel P is substantially unaffected and the light beam L20 exits as a p-polarized light component. In a state where an electric field is applied to the portion of the liquid crystal layer 83 corresponding to the pixel P, the polarization state of the light beam L20 having struck the pixel P is changed from the p-polarized state to the s-polarized state in accordance with a ratio corresponding to the gradation value specified in the image data. In other words, the s-polarized light component included in the light beam L21 is light that represents an image to be displayed, and the p-polarized light component included in the light beam L21 is light that represents a reversed image of the image to be displayed. The central axes of the light beams L21 exiting from the individual pixels P extend substantially parallel with each other and substantially perpendicular to the light exit surface of the liquid crystal layer 83.

Figure 4:
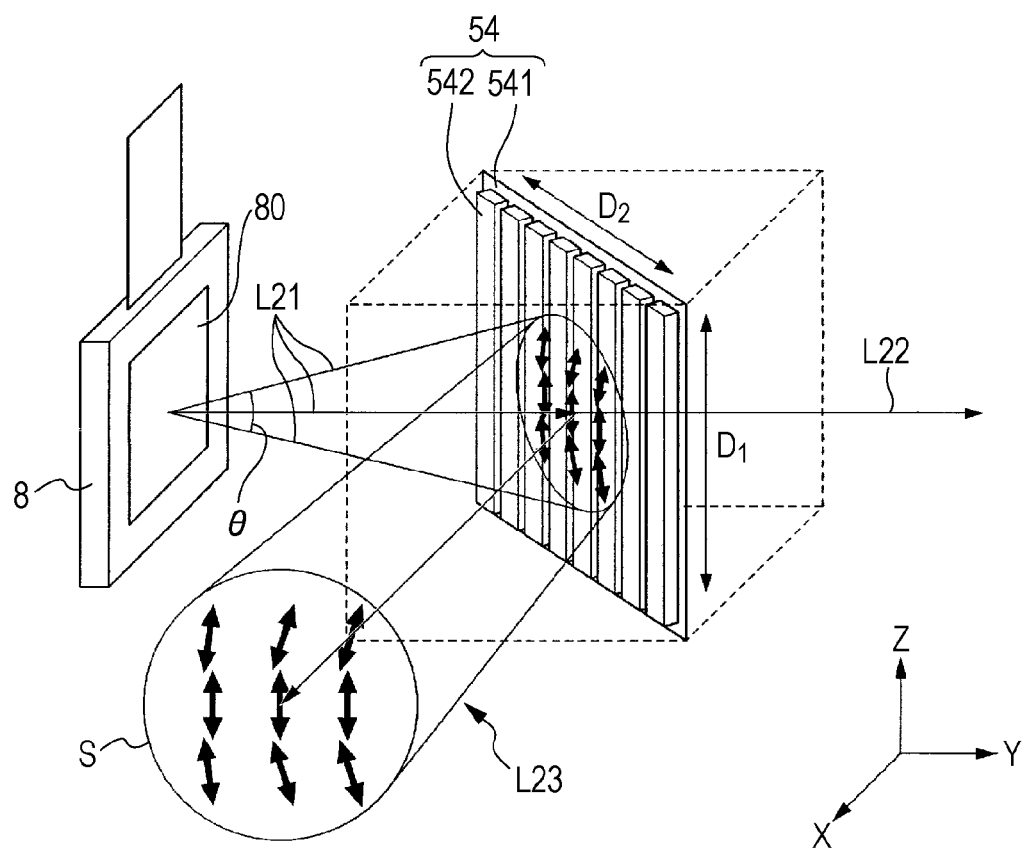
FIG. 4 is a conceptual diagram illustrating a polarization state of a light beam reflected by a WG element.

As illustrated in FIG. 4, the light beams L21 that have exited the pixels P have divergent angles θ (for example, about a 20° cone angle) in accordance with the divergent angles of the light source beams and so forth. Each light beam L21 having exited the reflective liquid crystal panel 8 strikes the polarization beam split surface 540 of the WG element 54. The p-polarized light component included in the light beam L21 is transmitted through the polarization beam split surface 540 and the s-polarized light component included in the light beam L21 is reflected by the polarization beam split surface 540. Out of the light beam L21, light that has been transmitted through the polarization beam split surface 540 constitutes a light beam L22 (mainly a p-polarized light component). The light beam L22 is directed toward the incidence side polarizing plate 51 and removed from an optical path toward the projection optical system 7. Out of the light beam L21, light having been reflected by the polarization beam split surface 540 constitutes a light beam L23 (mainly an s-polarized light component). The light beam L23 is directed toward the exit side polarizing plate 55 (refer to FIG. 2). The exit side polarizing plate 55 allows a linearly polarized light component to pass therethrough. In the exit side polarizing plate 55, a transmission axis is set so as to allow the p-polarized light component to pass therethrough. Out of the light beam L23, light having passed through the exit side polarizing plate 55 constitutes a light beam L24, which strikes the color combining element 6.

The red light beam L10 having struck the first image forming system 5*a* illustrated in FIG. 1 is modulated in the same way as used to modulate the green light beam L20 and exits the first image forming system 5*a* as an s-polarized red light beam L14 that represents the image to be displayed. Likewise, an s-polarized blue light beam L34 that represents the image to be displayed exits from the third image forming system 5*c*. The light beams L14, L24, and L34 strike the color combining element 6 as illustrated in FIG. 2.

Examples of the color combining element 6 include a dichroic prism and so forth. A dichroic prism has a structure where four triangular prisms are attached to each other. In a triangular prism, surfaces that are attached to surfaces of other triangular prisms are part of inner surfaces of the dichroic prism. On the inner surfaces of the dichroic prism, a wavelength selection surface that reflects red light and transmits green light and blue light is formed, and another wavelength selection surface that reflects blue light and transmits red light and green light are formed. The wavelength selection surfaces perpendicularly intersect each other.

The light beam L24, which is an s-polarized green light beam having struck the dichroic prism, directly exits the dichroic prism through the wavelength selection surfaces. The s-polarized blue light beam L34 and the s-polarized red light beam L14 which have struck the dichroic prism are selectively reflected by the wavelength selection surface or transmitted through the wavelength selection surface and exit the dichroic prism in a direction the same as that in which the s-polarized green light beam L24 exits. The green light beam L24 may be changed into p-polarized light component using a half-wavelength plate as needed. This allows the green light beam L24 to be efficiently transmitted through the dichroic prism. As described above, the three color light beams are superposed and combined into the polychromatic beam L, which strikes the projection optical system 7.

As illustrated in FIG. 1, the projection optical system 7 includes a first lens unit 71, a second lens unit 72, and the exit side aperture stop 73. The exit side aperture stop 73 is disposed on a pupil plane of the projection optical system 7.

The light beam L23 is a light beam to be projected to display an image. From the viewpoint of improving the contrast ratio of an image to be displayed, it is desirable that the light beam L23 does not include the p-polarized light component, which represents the reversed image. This is also true for the light beams that exit the first and third image forming systems 5*a* and 5*c*. However, it is difficult to completely split the p-polarized light component and the s-polarized light component from each other. In reality, a small fraction of the p-polarized light component is reflected by the polarization beam split surface 540 and included in the light beam L23. FIG. 4 schematically illustrates the polarization state of the light beam L23 in a spot S by showing polarization directions with the arrows.

The polarization state in the spot S is such that the polarization direction is substantially linear, that is, is substantially identical to the reflective axis direction $D_1$. However, the polarization direction of the light beam is elliptical and only close to linear in an area of the spot S where p-polarized light component is mixed. A major axis of the elliptically polarized light component is inclined relative to the reflective axis direction $D_1$. As a ratio of the p-polarized light component in the light beam L23 increases, an angle formed between the major axis of the elliptically polarized light component and the transmission axis of the exit side polarizing plate 55 becomes wider. When such an elliptically polarized light component strikes the exit side polarizing plate 55, the light beam that is transmitted through the exit side polarizing plate 55 has a light amount, which is equal to the square of an orthogonally projected amplitude of the elliptically polarized light component in the major axis direction onto the transmission axis of the exit side polarizing plate 55. In other words, if a desired light amount is assumed to be an amount of light that is transmitted through the exit side polarizing plate 55 in a case where the p-polarized light component is not included in the light beam L23, the difference between the desired light amount and the amount of light that is transmitted through the exit side polarizing plate 55 becomes larger as the ratio of the p-polarized light component included in the light beam L23 increases.

According to the aspect of the invention, out of angular light components included in each of the light beams L14, L24, and L34, those components with a relatively high ratio of the p-polarized light component are selectively blocked.

By doing this, the brightness of the image to be displayed is secured and the contrast ratio is improved. A mechanism by which angular light components in the light beam L24 with a relatively high ratio of the p-polarized light component are selectively blocked will be described below as a representative example of such mechanisms that deal with the light beams L14, L24, and L34.

Figure 5A:
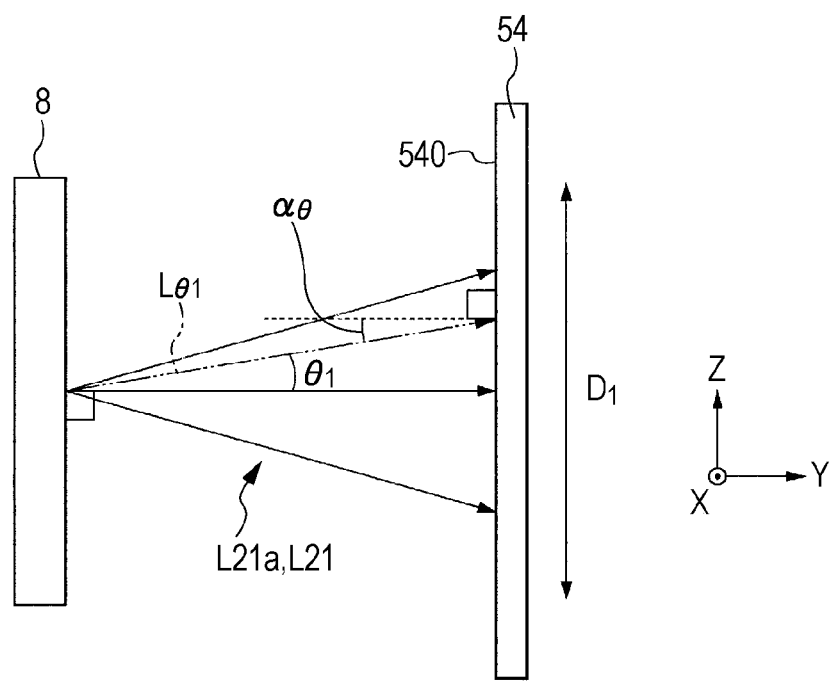
FIG. 5A illustrates an optical path of first light.

FIG. 5A illustrates an optical path of first light in a plane that is parallel with a normal direction (Y-direction) of the light exit surface of the liquid crystal layer 83 of the reflective liquid crystal panel 8 and is parallel with the reflective axis direction $D_1$ of the WG element 54. A reference sign $L_{\theta 1}$ denotes an angular light component that forms a first angle $\theta_1$ (°) with the normal direction of the light exit surface of the liquid crystal layer 83. The angular light component is a component of the first light L21a that has exited a certain pixel P of the reflective liquid crystal panel 8 and is divergent so as to spread in the reflective axis direction $D_1$. An incidence angle $\alpha_\theta$ (°) of the angular light component $L_{\theta 1}$ relative to the polarization beam split surface 540 is the same as the first angle $\theta_1$.

Figure 5B:
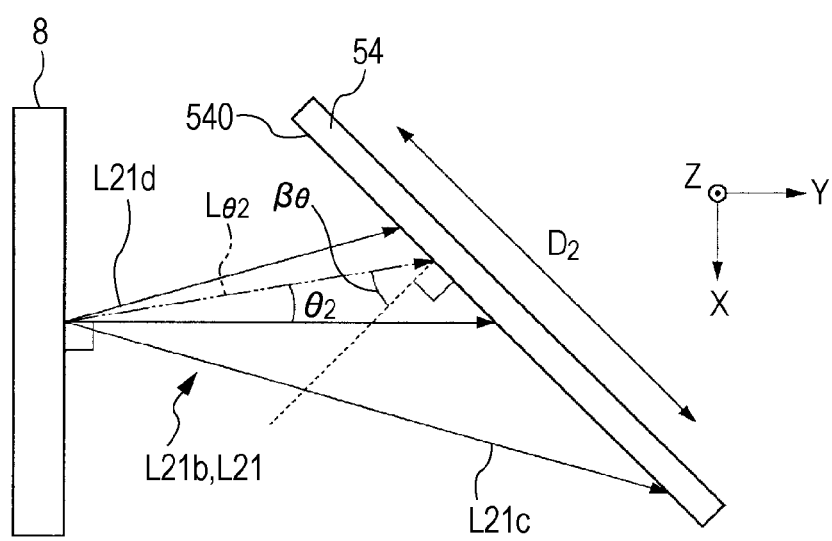
FIG. 5B illustrates an optical path of second light.

FIG. 5B illustrates an optical path of second light in a plane that is parallel with a normal direction (Y-direction) of the light exit surface of the liquid crystal layer 83 of the reflective liquid crystal panel 8 and is parallel with the transmission axis direction $D_2$ of the WG element 54. A reference sign $L_{\theta 2}$ denotes an angular light component that forms a second angle $\theta_2$ (°) with the normal direction of the light exit surface of the liquid crystal layer 83. The angular light component is a component of the second light L21b that has exited a certain pixel P of the reflective liquid crystal panel 8 and is divergent so as to spread in the transmission axis direction $D_2$. An incidence angle $\beta_\theta$ (°) of the angular light component $L_{\theta 2}$ relative to the polarization beam split surface 540 has a relationship with the second angle $\theta_2$ as follows. That is, $\beta_\theta = 45 - \theta_2$.

Figure 6:
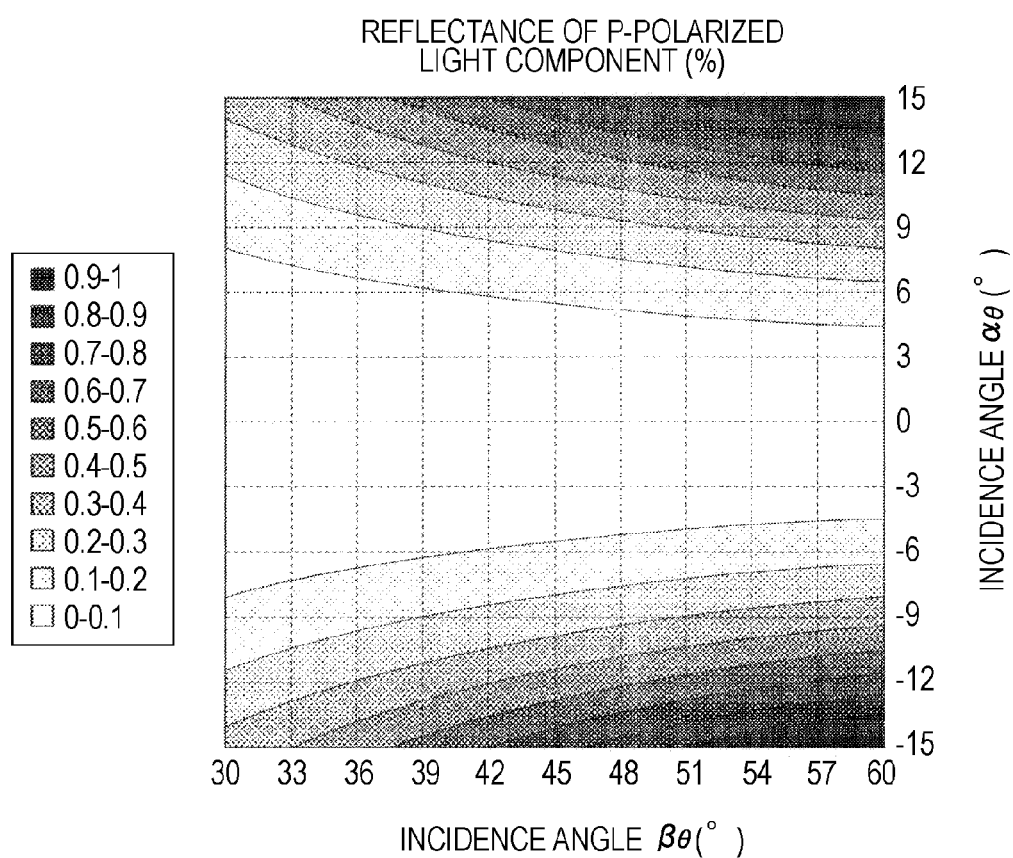
FIG. 6 is a graph illustrating incidence-angle dependency of a polarization beam split function of the WG element.

FIG. 6 is a graph illustrating an example of the incidence-angle dependency of a polarization beam split function of the WG element 54. As illustrated in FIG. 6, the polarization beam split function of the WG element 54 is dependent upon incidence angles. The reflectance of the p-polarized light component at the polarization beam split surface 540 (ideally 0%) varies depending on differences in incidence angles $\alpha_\theta$ and $\beta_\theta$. As the incidence angle $\alpha_\theta$ increases as a positive value or a negative value from 0°, the reflectance of the p-polarized light component increases. As described above, the incidence angle $\alpha_\theta$ is equal to the first angle $\theta_1$ that is divergent from the reflective liquid crystal panel 8 to the polarization beam split surface 540 so as to spread in the reflective axis direction $D_1$ (polarization direction of the first polarized light component). Therefore, as the absolute value of the first angle $\theta_1$ of an angular light component becomes larger from 0°, the p-polarized light component included in the angular light component tends to be reflected by the polarization beam split surface 540, thereby increasing the ratio of the p-polarized light component after the reflection off the polarization beam split surface 540.

The contours representing the reflectance of the p-polarized light component are substantially drawn along the lateral axis and show that the incidence-angle dependency due to the difference in incidence angle $\alpha_\theta$ is more noticeable than that due to the difference in the incidence angle $\beta_\theta$. As described above, incidence angle $\beta_\theta$ corresponds to the second angle $\theta_2$ that is divergent from the reflective liquid crystal panel 8 to the polarization beam split surface 540 so as to spread in the transmission axis direction $D_2$ (polarization direction of the second polarized light component). In other words, compared with the light beam that has just been emitted from the light source 2, if the light amount of the angular light component of the projected light beam is limited to an angle range wider in the reflective axis direction $D_1$ than in the transmission axis direction $D_2$, the contrast ratio can be improved with a minimum reduction in the brightness.

In addition, reflectance at an interface increases as the light beam incidence angle relative to the interface becomes larger. Therefore, as the incidence angle $\beta_\theta$ becomes larger, the incidence-angle dependency due to the difference in the incidence angle $\alpha_\theta$ becomes more noticeable. For example, when $\beta_\theta = 30°$, a change in the reflectance from $\alpha_\theta = 0°$ to $\alpha_\theta = 15°$ is about 0.3%. In contrast, when $\beta_\theta = 60°$, a change in the reflectance from $\alpha_\theta = 0°$ to $\alpha_\theta = 15°$ is about 0.9%. Referring to FIG. 5B, third light L21c, which is divergent so as to spread along the side of the polarization beam split surface 540 that is an increasing distance from the light exit surface of the liquid crystal layer 83, has a larger incidence angle $\beta_\theta$ relative to the polarization beam split surface 540 than the incidence angle $\beta_\theta$ of fourth light L21d, which is divergent so as to spread along the side of the polarization beam split surface 540 that is a decreasing distance from the light exit surface of the liquid crystal layer 83. In other words, compared with the light beam that has just been emitted from the light source 2, if the light amount of the angular light component of the projected light beam is limited to an angular range that is wider in a direction in which the third light L21c spreads than in a direction in which the fourth light L21d spreads, an effect of improving the contrast ratio is increased with a minimum reduction in brightness.

Referring back to FIG. 2, the incidence side aperture stop 33 includes a light shielding portion 331 that has an aperture 332 through which light passes. The exit side aperture stop 73 includes a light shielding portion 731 that has an aperture 732 through which light passes. In the present embodiment, the aperture 332 and the aperture 732 are formed to be of a substantially trapezoidal shape.

In the aperture 332 of the incidence side aperture stop 33, a maximum inner dimension in a direction along parallel opposing sides of the trapezoid (referred to as the Z-direction or the lateral direction) is smaller than that in a direction perpendicular to the opposing sides (referred to as the X-direction or the longitudinal direction). The longitudinal direction of the aperture 332 is substantially identical to the polarization direction of the p-polarized light component and the lateral direction of the aperture 332 is substantially identical to the polarization direction of the s-polarized light component. In the aperture 332, the dimension in the lateral direction on one side is shorter than that on the other side in the longitudinal direction. The light beam L20 having passed through one side of the aperture 332 strikes the reflective liquid crystal panel 8 and then exits therefrom as the third light L21c. The light beam L20 having passed through the other side of the aperture 332 strikes the reflective liquid crystal panel 8 and then exits therefrom as the fourth light L21d.

In the light beam L20 having passed through the incidence side aperture stop 33, when compared with the light beam that has just been emitted from the light source 2, the light amount of the angular light component (first light) that is divergent so as to spread in the s-polarization direction (reflective axis direction $D_1$) is limited more than that of the angular light component (second light) that is divergent so as to spread in the p-polarization direction (transmission axis direction $D_2$) is. The light beam L20 in this state strikes the reflective liquid crystal panel 8 through the WG element 54. The modulated light beam L21, in which the amount of the first light is limited more than that of the second light is, strikes again the WG element 54. Since the wide angle component of the first light, which tends to cause reflection of the mixed p-polarized light component on the polarization beam split surface 540, is preferentially blocked, the p-polarized light component included in the light beam L23 reflected by the polarization beam split surface 540 can be decreased.

In addition, when compared with a case where the light amount of the second light is limited to the same degree as that of the first light is, the second light, in which the occurrence of the reflection of the mixed p-polarized light component by the polarization beam split surface 540 is unlikely, can be increased. In particular, since the incidence side aperture stop 33 limits the light amount of the angular light component that will become the third light L21c more than that of the angular light component that will become the fourth light L21d, the p-polarized light component included in the light beam L23 can be decreased and the second light can be effectively increased.

Since the light amount of the components of the light beam L20 unnecessary for displaying the image is limited before the light beam L20 strikes the reflective liquid crystal panel 8, degradation of the reflective liquid crystal panel 8 caused by these unnecessary components can be prevented and light resistance of the reflective liquid crystal panel 8 can be increased.

In the aperture 732 of the exit side aperture stop 73, a maximum inner dimension in a direction along parallel opposing sides of the trapezoid (referred to as the Z-direction or the lateral direction) is smaller than that in a direction perpendicular to the opposing sides (referred to as the Y-direction or the longitudinal direction). The longitudinal direction of the aperture 732 is substantially identical to the polarization direction of the p-polarized light component and the lateral direction of the aperture 732 is substantially identical to the polarization direction of the s-polarized light component. In the aperture 732, the dimension in the lateral direction on one side is shorter than that on the other side in the longitudinal direction. The third light L21c having exited the reflective liquid crystal panel 8 strikes one side of the aperture 732. The fourth light L21d having exited the reflective liquid crystal panel 8 strikes the other side of the aperture 732.

In the light beam L24 having passed through the exit side aperture stop 73, when compared with the state before striking the exit side aperture stop 73, the amount of the first light that spreads in the reflective axis direction $D_1$ is limited more than that of the second light that spreads in the transmission axis direction $D_2$ upon striking the polarization beam split surface 540. The wide angle component of the first light, which includes a relatively greater amount of the reflection of the mixed p-polarized light component at the polarization beam split surface 540 than that included in the second light, is preferentially removed from the light beam L24 having passed through the exit side aperture stop 73. The light beam L24 is projected by the projection optical system 7.

In addition, when compared with a case where the amount of the second light is limited to the same degree as that of the first light is, the second light, which is unlikely to cause the reflection of the mixed p-polarized light component at the polarization beam split surface 540, can be increased. In particular, since the light amount of the angular light component that derived from the third light L21c is limited more than that of the angular light component that derived from the fourth light L21d is with the exit side aperture stop 73, the p-polarized light component included in the light beam L24 can be decreased and the second light can be effectively increased.

As described above, the light beam L24 is projected by the projection optical system 7 while the light amount limited by the incidence side aperture stop 33 and the exit side aperture stop 73 is suppressed and the p-polarized light component, which represents the reversed image, is effectively decreased. Thus, the contrast ratio can be improved with a minimum reduction in brightness.

Figure 7:
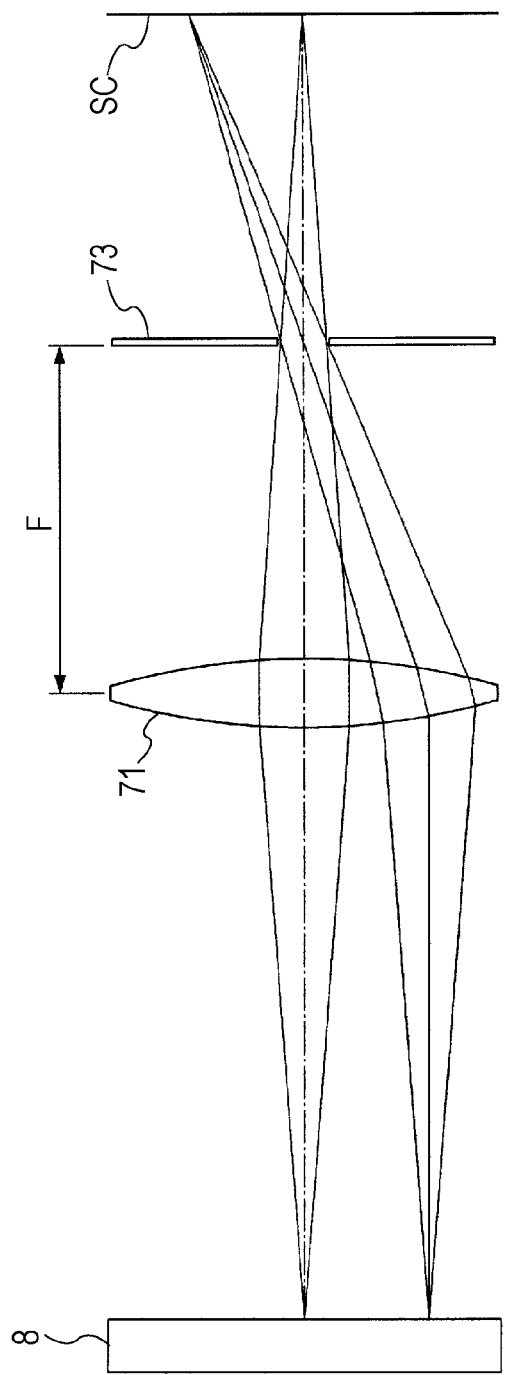
FIG. 7 illustrates an arrangement of an exit side aperture stop.
Figure 8:
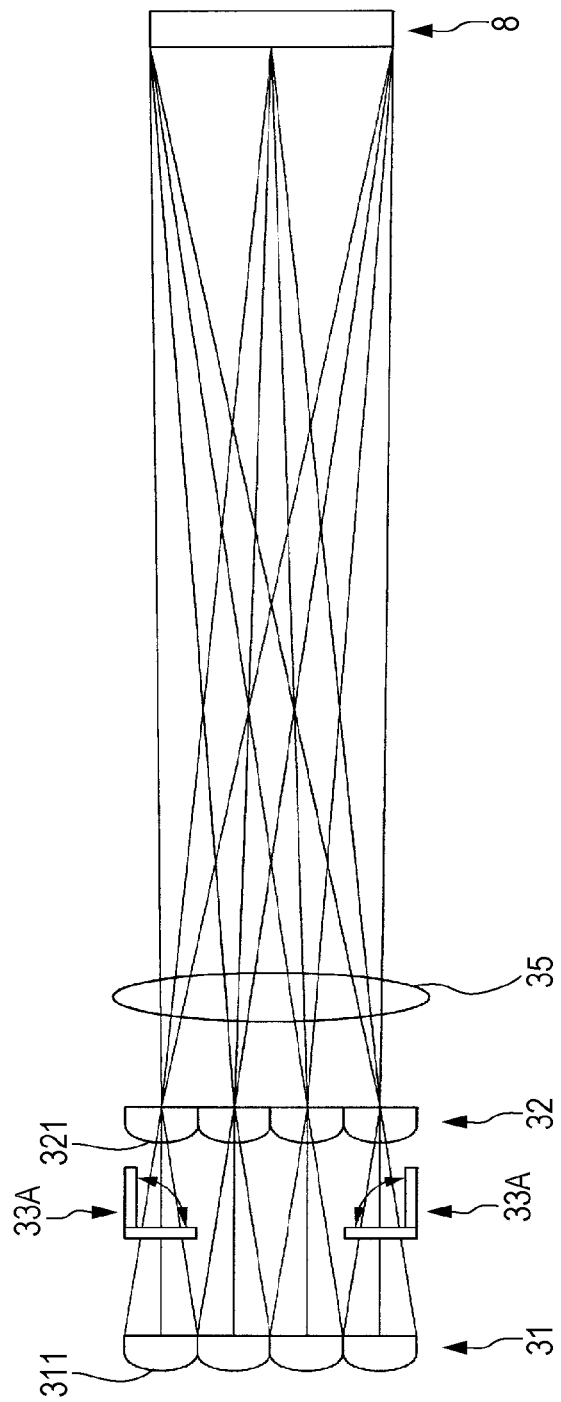
FIG. 8 illustrates an example of an incidence side aperture stop.
Figure 9:
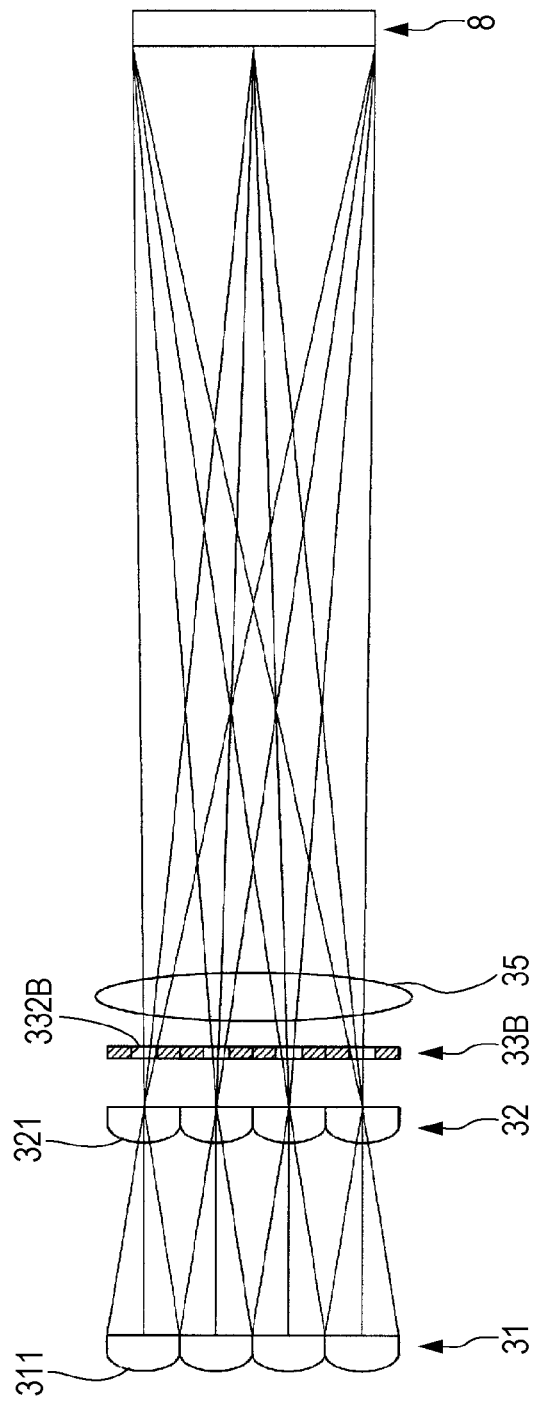
FIG. 9 illustrates another example of an incidence side aperture stop, which is different from that in FIG. 8.

Next, the way in which the aperture stops are arranged will be described with reference to FIGS. 7 to 9. FIG. 7 illustrates the optical path of an object side telecentric optical system, which corresponds to the projection optical system 7. FIG. 8 illustrates an example of an arrangement of the incidence side aperture stop 33. FIG. 9 illustrates another example of an arrangement of the incidence side aperture stop 33, which is different from that in FIG. 8.

As FIG. 7 illustrates, the projection optical system 7 can be treated as an object side telecentric optical system where the reflective liquid crystal panel 8 is the object side. Principal light beams having exited the pixels of the reflective liquid crystal panel 8 meet at the focal point through the first lens unit 71. A plane that includes this focal point and perpendicularly intersects the optical axis of the first lens unit 71 is the pupil plane, on which the exit side aperture stop 73 is disposed. The distance between the first lens unit 71 and the exit side aperture stop 73 is assumed to be a focal distance F of the first lens unit 71.

The light beams having exited the pixels P of the reflective liquid crystal panel 8 form spots in substantially the same area on the pupil plane regardless of the pixels from which the light beams have exited. A light intensity distribution over the spots is such that angular light components of the light beams having exited from the pixels P are spatially mapped in accordance with the angles thereof. For example, as an angle formed between an angular light component and the normal direction of the reflective liquid crystal panel 8 becomes greater, the angular light component moves to a position further from the optical axis of the projection optical system 7, and such an angle becomes smaller, the angular light component moves to a position closer to the optical axis of the projection optical system 7.

When the exit side aperture stop 73 is disposed on the pupil plane of the projection optical system 7, the light beams having exited from any pixels can be controlled to have a uniform divergent angle. Thus, the amount of the first light can be limited more than that of the second light is without decreasing the size of the image to be displayed. In addition, the angular light components are spatially distributed at positions on the pupil plane in accordance with the divergent angles. This facilitates selective and precise limitation of the light amount of the angular light components as desired. Since the light amount is limited immediately before the light beam is projected onto the projection surface SC, the light that represents the reversed image can be exactly removed.

In an example of an arrangement in FIG. 8, an incidence side aperture stop 33A is disposed on the optical path between the first lens array 31 and the second lens array 32. The incidence side aperture stop 33A can block the optical path between the first lens array 31 and the second lens array 32 such that the area to block the optical path can be varied.

By disposing the incidence side aperture stop 33A on the optical path between the first lens array 31 and the superimposing lens 35, the light amount of the light beams is limited before the light beams are superimposed. Thus, occurrence of unevenness in illumination intensity on the reflective liquid crystal panel 8 is suppressed. In addition, the first lens array 31 and the second lens array 32 are spaced apart from each other by the focal distance of the lens elements 311 that constitute the first lens array 31. This facilitates allocation of a space that is used to accommodate a mechanism for varying the aperture diameter of the incidence side aperture stop 33A.

In the example of an arrangement illustrated in FIG. 9, an incidence side aperture stop 33B is disposed on the optical path between the second lens array 32 and the superimposing lens 35. The incidence side aperture stop 33B includes apertures 332B arranged along the surface that substantially perpendicularly intersects the optical axis of the superimposing lens 35. The apertures 332B correspond to the lens elements 321, which constitute the second lens array 32, in a one-to-one relationship. The light beams having exited the lens elements 321 are superimposed on the reflective liquid crystal panel 8 by the superimposing lens 35 through the corresponding apertures 332B. Every aperture 332B is formed to be of a similar shape, for example, a substantially trapezoidal shape in plan view the same as the aperture 332 described above. By doing this, when compared with, for example, the above example, the divergent angles of the light beams having exited the lens elements 321 can be more precisely controlled. In addition, the light amounts of the light beams having exited the lens elements 321 are evenly limited, thereby preventing most unevenness in illumination intensity, which may otherwise be caused by the incidence side aperture stop 33B, on the reflective liquid crystal panel 8.

Examples of aperture shapes of the aperture stops and contrast ratios with regard to transmission factors of the aperture stops will be described below with reference to FIGS. 10A to 10F and FIG. 11. FIGS. 10A to 10D are plan views illustrating the aperture shapes of the aperture stops in first to fourth embodiments. FIGS. 10E and 10F are plan views illustrating the aperture shapes of the aperture stops in first and second comparative examples. In FIGS. 10A to 10F, the reference sign $D_3$ denotes a polarized direction of the s-polarized light component that is s-polarized with respect to the polarization beam split surface 540 when the s-polarized light component passes through the aperture stop, and the reference sign $D_4$ denotes a polarized direction of the p-polarized light component that is p-polarized with respect to the polarization beam split surface 540 when the p-polarized light component passes through the aperture stop.

An aperture stop C1 of the first comparative example as illustrated in FIG. 10E includes a light shielding portion C10 in which an aperture C11 having a substantially circular shape in plan view is provided.

An aperture stop C2 of the second comparative example as illustrated in FIG. 10F is a variable aperture and includes a light shielding portion C20 in which an aperture C21 having a regular hexagon shape in plan view is provided.

The first to fourth embodiments are examples of aperture stops according to the aspect of the invention.

Figure 10A:
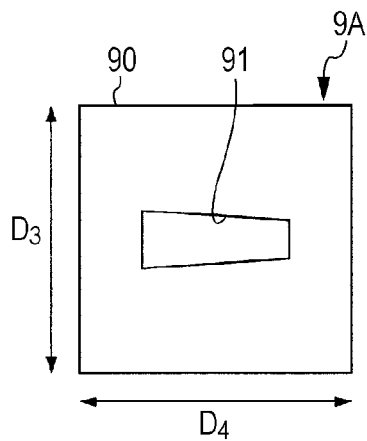
FIG. 10A is a plan view illustrating a shape of an aperture of an aperture stop of a first embodiment.

An aperture stop 9A of the first embodiment as illustrated in FIG. 10A includes a light shielding portion 90 in which an aperture 91 having a substantially trapezoidal shape in plan view is provided.

Figure 10B:
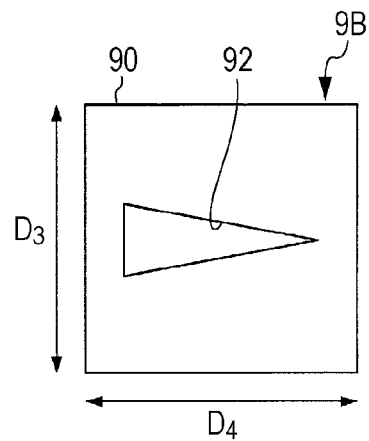
FIG. 10B is a plan view illustrating a shape of an aperture of an aperture stop of a second embodiment.

An aperture stop 9B of the second embodiment as illustrated in FIG. 10B includes the light shielding portion 90 in which an aperture 92 having a substantially triangular shape in plan view is provided.

Figure 10C:
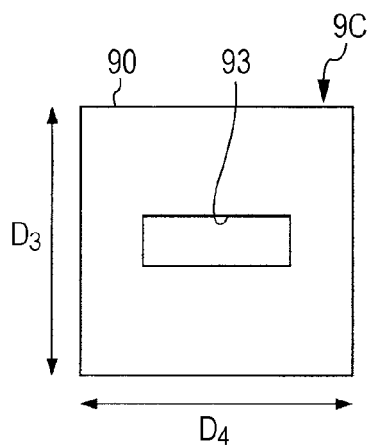
FIG. 10C is a plan view illustrating a shape of an aperture of an aperture stop of a third embodiment.

An aperture stop 9C of the third embodiment as illustrated in FIG. 10C includes the light shielding portion 90 in which an aperture 93 having a substantially rectangular shape in plan view is provided.

Figure 10D:
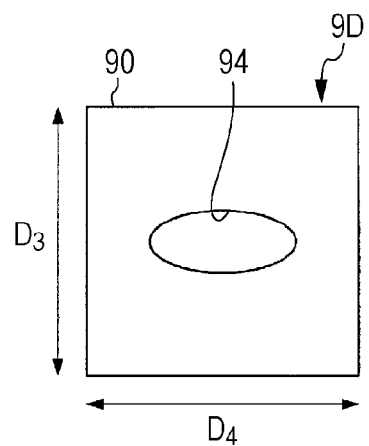
FIG. 10D is a plan view illustrating a shape of an aperture of an aperture stop of a fourth embodiment.
Figure 10E:
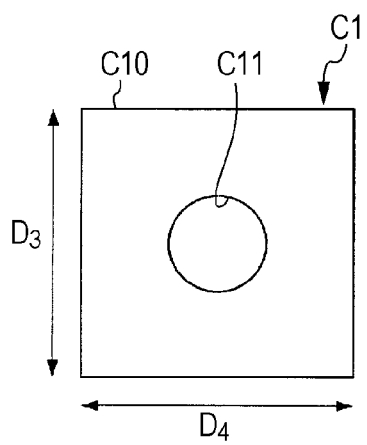
FIG. 10E is a plan view illustrating a shape of an aperture of an aperture stop of a first comparative example.
Figure 10F:
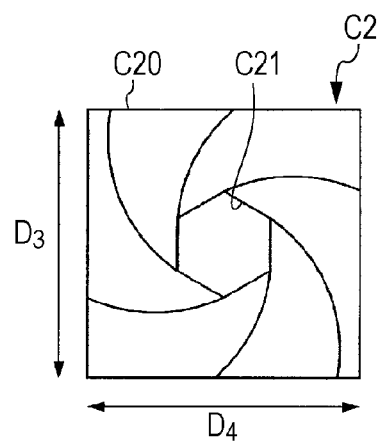
FIG. 10F is a plan view illustrating a shape of an aperture of an aperture stop of a second comparative example.

An aperture stop 9D of the fourth embodiment as illustrated in FIG. 10D includes the light shielding portion 90 in which an aperture 94 having a substantially elliptic shape in plan view is provided.

In each of the apertures 91 to 94, a maximum inner dimension in the polarization direction $D_3$ of the s-polarized light component is smaller than that in the polarization direction $D_4$ of the p-polarized light component. In the apertures 91 and 92, inner dimensions in the polarization direction $D_3$ of the s-polarized light component are different from each other on one and the other sides in the polarization direction $D_4$ of the p-polarized light component. The apertures 91 and 92 are provided such that the side with the smaller inner dimension in the polarization direction $D_3$ of the s-polarized light component is the side where the third light strikes.

Figure 11:
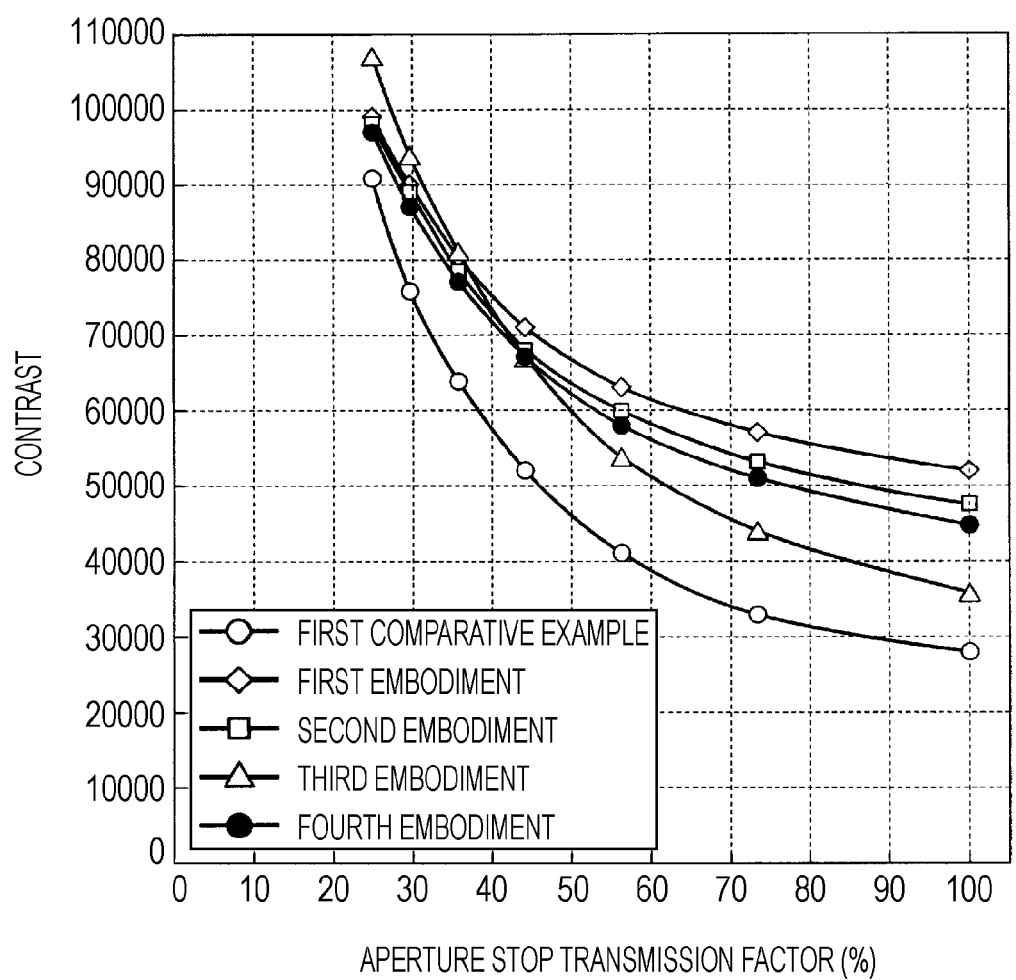
FIG. 11 is a graph illustrating comparison of contrast ratios with regard to transmission factors of the aperture stops in the first to fourth embodiments and the first comparative example.

FIG. 11 is a graph illustrating comparison of the contrast ratios with regard to the transmission factors of the aperture stops in the first to fourth embodiments and the first comparative example. In the aperture stops 9A to 9D of the first to fourth embodiments, an aspect ratio of each of the apertures 91 to 94 is set to 1:3. Here, the aspect ratio corresponds to a ratio of the maximum inner dimension in the polarization direction $D_3$ of the s-polarized light component to that in the polarization direction $D_4$ of the p-polarized light component. In each of the first to fourth embodiments and the first and second comparative examples, the aperture stop is disposed so that the barycentric position of the aperture shape is on the optical axis of the projection optical system 7. In FIG. 11, the lateral axis of the graph represents opening ratio, which is normalized by setting to 100% the transmission factor of a circular aperture stop (for example, the first comparative example) having an F-number of 3.

As can be seen from the graph in FIG. 11, the contrast ratio becomes higher as the F-number becomes greater (that is, the aperture diameter becomes smaller) even in the first comparative example that is similar to the related art. With the same aperture stop transmission factor, the contrast ratios of the first to fourth embodiments are higher than that of the first comparative example. With the same contrast ratio, the aperture stop transmission factors of the first to fourth embodiments are higher than that of the first comparative example. Thus, by using the aperture stops of the first to fourth embodiments according to the aspect of the invention, an effect of improving the contrast ratio can be achieved with a minimum reduction in brightness.

When the first embodiment and the third embodiment are compared, the first embodiment can achieve a higher contrast ratio and a higher aperture stop transmission factor. That is, it is understood that, by setting the inner dimension of the aperture in the polarization direction D3 of the s-polarized light component such that the inner dimension of the side where the third light strikes is smaller than that of the side where the fourth light strikes, an effect of improving the contrast ratio can be increased with a minimum reduction in brightness.

In the second embodiment, although the effect of improving the contrast ratio is small in an area where values of the aperture stop transmission factor are high, the highest contrast ratio can be achieved by setting a lower aperture stop transmission factor value. This can be attributed to the fact that, since the aspect ratios of the apertures are fixed to 1:3 in the first to fourth embodiments, the inner dimension of the side where the third light strikes (the base of the triangle) becomes relatively greater than that of the first, third and fourth embodiments. That is, by optimizing the aspect ratio so as to limit angular light components that strike the side where the third light strikes, the effect of improving the contrast ratio in the area with the higher aperture stop transmission factor can be increased. Since the highest contrast ratio can be achieved by setting a small aperture stop transmission factor, this can also be applied to an aperture stop for which the shape of an aperture is variable such as in the modification below.

In the fourth embodiment, a diagonal length of the rectangle is shorter than that of a rectangular aperture having short sides and long sides in the polarization direction $D_3$ of the s-polarized light component and the polarization direction $D_4$ of the p-polarized light component (for example, the third embodiment). Thus, the effect of improving the contrast ratio can be increased under a condition where a viewing angle of the reflective liquid crystal panel 8 is narrow.

Figure 12A:
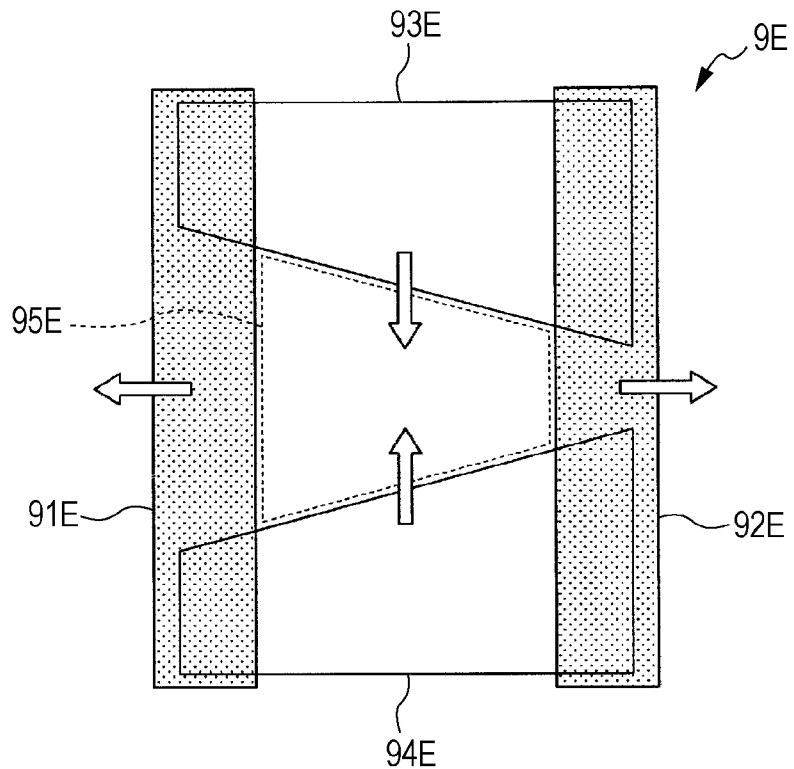
FIG. 12 is a plan view illustrating an aperture stop of the modification.
Figure 12B:
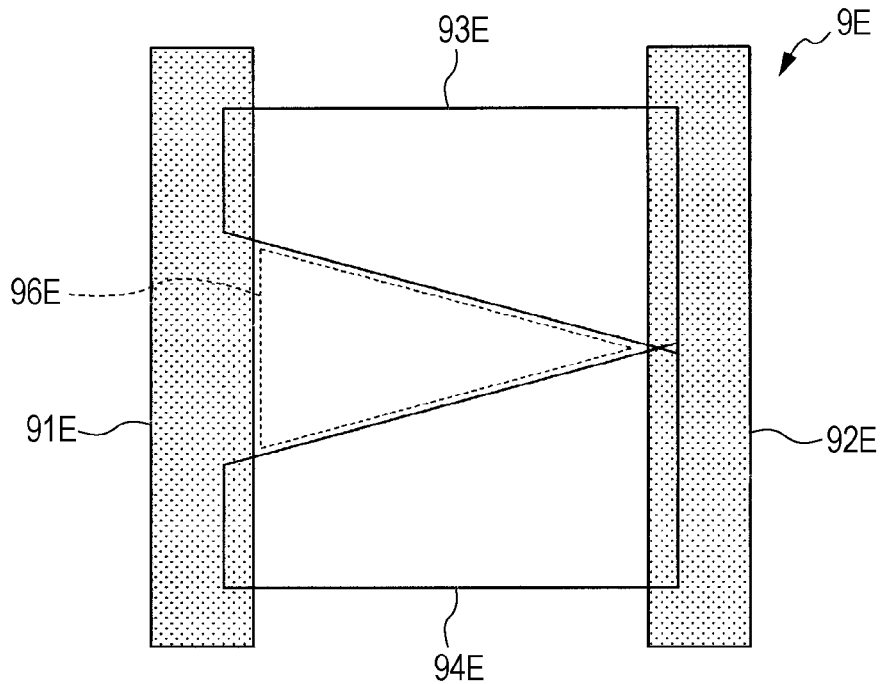

FIG. 12 is a plan view illustrating an aperture stop 9E of the modification. The aperture stop 9E includes a light shielding portion constituted by light shielding members 91E to 94E. An area surrounded by the light shielding members 91E to 94E is an aperture 95E having a substantially trapezoidal shape in plan view. The light shielding members 91E and 92E constitute opposite sides that are parallel with each other in the shape of the aperture 95E. The light shielding members 93E and 94E constitute opposite sides that are not parallel with each other in the shape of the aperture 95E.

To decrease the opening ratio of the aperture stop at the aperture stop 9E, for example, the light shielding members 91E and 92E are moved away from each other and the light shielding members 93E and 94E are moved close to each other. By doing this, an aperture 96E having a substantially triangular shape in plan view is achieved. As described in the above embodiments, in the first embodiment including the aperture 91 having a substantially trapezoidal shape in plan view, the contrast ratio becomes higher in particular in the area where values of the aperture stop transmission factor are high, and in the second embodiment including the aperture 92 having a substantially triangular shape in plan view, the contrast ratio becomes higher in particular in the area where values of the aperture stop transmission factor are low. Thus, the aperture stop 9E of the modification enables the contrast ratio to be significantly improved over a wide range of values of the aperture stop transmission factor.

As described above, in the projector 1 according to the aspect of the invention, the incidence side aperture stop 33 and exit side aperture stop 73 are utilized to limit the amount of the first light that relatively readily causes the reflection of the mixed p-polarized light component more than that of the second light. Therefore, the light amount of the s-polarized light component, which indicates the image to be displayed, limited by the aperture stop can be decreased and the p-polarized light component, which represents the reversed image, can be removed from light beams to be projected. This can achieve a projected image having both high contrast and high luminance.

It should be understood that the technical scope of the aspect of the invention is not limited to the above embodiments. A variety of modifications can be achieved without departing from the gist of the aspect of the invention. For example, the light source may be a solid state light source such as a light emitting diode (LED) or a laser diode (LD) instead of a lamp light source. The configuration of the integrator optical system and the color splitting optical system may be omitted or changed in accordance with light source types and so forth.

The effect of improving the contrast ratio with a minimum reduction in brightness can be achieved when at least one of the incidence side aperture stop 33 and exit side aperture stop 73 is provided.

In the above embodiments, by devising the aperture shape of the aperture stop, the amount of the first light is limited more than that of the second light. An aperture stop having directional anisotropy can also be constructed by spatially changing the value of the transmission factor within the aperture. For example, the aperture is formed to be of a planer view substantially square shape and a semi-transmissive portion is provided so as to continuously or gradually decrease the value of the transmission factor from a central portion to a peripheral portion of the aperture in the polarization direction of the s-polarized light component passing through the aperture. This makes the transmission factor of the light beam passing through the above aperture be lower in the peripheral portion than in the central portion of the aperture, thereby limiting the amount of the first light more than that of the second light.

The entire disclosure of Japanese Patent Application No. 2010-015131, filed Jan. 27, 2010 is expressly incorporated by reference herein.

What is claimed is:

1. A reflective liquid crystal projector, comprising:
a light source;
a reflective liquid crystal panel that modulates a light beam emitted from the light source;
a wire grid polarization beam splitter element that is disposed in a position where the light beam having been modulated with the reflective liquid crystal panel strikes, the wire grid polarization beam splitter element being provided with a polarization beam split surface that reflects a first polarized light component of the modulated light beam and transmits a second polarized light component having a polarization direction that substantially perpendicularly intersects the first polarized light component;
a projection optical system that projects the first polarized light component having been reflected by the wire grid polarization beam splitter element; and
an aperture stop that is disposed on an optical path of the light beam emitted from the light source, the aperture stop limiting the amount of first light more than the amount of second light, the first light being divergent from the reflective liquid crystal panel to the polarization beam split surface so as to spread in a polarization direction of the first polarized light component, and the second light being divergent from the reflective liquid crystal panel to the polarization beam split surface so as to spread in the polarization direction of the second polarized light component.

2. The reflective liquid crystal projector according to claim 1,
wherein the aperture stop is provided with a light shielding portion having an aperture through which light passes, and
wherein a maximum inner dimension of the aperture in the polarization direction of the first polarized light component that passes through the aperture is smaller than a maximum inner dimension of the aperture in a direction perpendicular to the polarization direction of the first polarized light component.

3. A reflective liquid crystal projector, comprising:
a light source;
a reflective liquid crystal panel that modulates a light beam emitted from the light source;
a wire grid polarization beam splitter element that is disposed in a position where the light beam having been modulated with the reflective liquid crystal panel strikes, the wire grid polarization beam splitter element being provided with a polarization beam split surface that reflects a first polarized light component of the modulated light beam and transmits a second polarized light component having a polarization direction that substantially perpendicularly intersects the first polarized light component;

a projection optical system that projects the first polarized light component having been reflected by the wire grid polarization beam splitter element; and an aperture stop that is disposed on an optical path of the light beam emitted from the light source, the aperture stop limiting the amount of first light more than the amount of second light, the first light being divergent from the reflective liquid crystal panel to the polarization beam split surface so as to spread in a polarization direction of the first polarized light component, and the second light being divergent from the reflective liquid crystal panel to the polarization beam split surface so as to spread in the polarization direction of the second polarized light component, wherein the polarization beam split surface of the wire grid polarization beam splitter element is not parallel with a light exit surface of a liquid crystal layer included in the reflective liquid crystal panel, and wherein the aperture stop limits the amount of a third light more than a fourth light, the third light being divergent so as to spread along a side of the polarization beam split surface that is an increasing distance from the light exit surface of the liquid crystal layer, and the fourth light being divergent so as to spread along a side of the polarization beam split surface that is a decreasing distance from the light exit surface of the liquid crystal layer.

4. The reflective liquid crystal projector according to claim 3, wherein the aperture stop is provided with a light shielding portion having an aperture through which light passes, and wherein inner dimensions of the aperture in the polarization direction of the first polarized light component that passes through the aperture are such that, in the direction perpendicular to the polarization direction of the first polarized light component, the inner dimension is smaller on a side where the third light strikes than the inner dimension on another side where the fourth light strikes.

5. The reflective liquid crystal projector according to claim 1, wherein the aperture stop is disposed on a pupil plane of the projection optical system.

6. The reflective liquid crystal projector according to claim 1, further comprising:

a lens array that is disposed on an optical path between the light source and the reflective liquid crystal panel, the lens array having a plurality of lens elements arranged on a plane that substantially perpendicularly intersects an optical axis of the light source; and a superimposing lens that is disposed on an optical path between the lens array and the reflective liquid crystal panel, wherein each of the plurality of lens elements condenses a corresponding one of the light beams having been emitted from the light source, and the superimposing lens superimposes each of the light beams having been condensed with a corresponding one of the plurality of lens elements on the reflective liquid crystal panel, and wherein the aperture stop is disposed on an optical path between the lens array and the superimposing lens.

* * * * *